United States Patent Office 2,952,636
Patented Sept. 13, 1960

2,952,636

ASSOCIATES OF INORGANIC METAL COMPOUNDS WITH COPOLYMERS CONTAINING A PLURALITY OF HYDROXY GROUPS

Jacob Groot and Willem J. Pieters, Amsterdam, Netherlands, assignors to Shell Oil Company, New York, N.Y., a corporation of Delaware No Drawing. Filed Apr. 16, 1956, Ser. No. 578,188

Claims priority, application Netherlands Apr. 22, 1955

16 Claims. (Cl. 252—25)

This invention relates to new associates of inorganic metal compounds with polymeric materials containing a plurality of non-acidic hydroxy groups, said associates being of particular value as multi-purpose additives in compositions used as lubricants for internal combustion motors.

In compositions used to lubricate modern internal combustion motors, it is often desirable to have present one or more inorganic anions and/or cations. For example, the presence of the hydroxyl ion ($OH^-$) or the carbonate ion ($CO_3^=$) may be desirable to effect neutralization of the highly corrosive acidic by-products of combustion and/or decomposition of various components of the fuel used in the motor. In other cases, it may be desirable to have non-basic inorganic materials present—as, for example, molybdenum disulfide ($MoS_2$) to act as extreme pressure agent, or a metal nitrite to act as corrosion inhibitor, or a boron-containing compound to modify the combustion characteristics of the combustion chamber of the motor. Most, if not all, of such inorganic compounds are substantially insoluble in lubricating oils, and to be of value, such compounds must be made soluble, or permanently suspended in lubricating oils. Oil-solubilization of such inorganic compounds has been accomplished in the past by preparing a "basic salt" or "complex" of the inorganic compound with such oil-soluble organic materials as the metal salts of organic sulfonic acids, carboxylic acids, phosphoric acids, thiocarbamic acids, phenols, and the like. Such "basic salts" and "complexes" have not proven entirely satisfactory in actual use, for it has been found that such complexes do not inhibit—but in fact in many cases actually promote—oxidation of various other components of the lubricating compositions in which the complexes are used. Furthermore, many of these complexes and/or the materials formed from them during use of the lubricating composition, react directly with other components of the composition, with consequent adverse effect upon these other components. In some cases, the materials formed from the complexes during use of the lubricating composition are corrosive to the metals of the motor which they contact.

We have now discovered that inorganic metal compounds may be made stably and permanently incorporable with mineral oils by forming an associate of the metal compound with an oil-soluble, non-ionic surface-active agent having a plurality of non-acidic hydroxyl groups. We have also discovered that such associates provide high detergency, high dispersing power and a very large capacity for neutralizing acidic materials in lubricating compositions in which such associates are used. Further, these associates are excellent anti-oxidants and the associates, and the materials derived therefrom during use of the lubricating composition of which they are a part are substantially inert with respect to the usual components of such compositions, and also are not corrosive to the metal portions of the motor which they contact.

The reaction products of the inorganic metal compounds with the surface-active agents which comprise this invention are termed "associates" because the precise nature of the relationship between the inorganic metal compound and the surface-active agent is not known. It is believed that there is no chemical reaction, or at most a minor degree of chemical reaction between the surface-active agent and the inorganic compound. Also, it is not known with certainty whether the inorganic metal compound is present in oils containing the associate as a true solute, or whether it is present in the form of a stable suspension—that is to say, it is not known with certainty whether a true complex of the inorganic metal compound and the surface-active agent is formed, or whether the surface-active agent acts as solubilizer or dispersant for the inorganic metal compound. Mixtures of the new associates and various oils do not exhibit the Tyndall effect. It is believed that the associates form micelles in oil, the inorganic metal compound forming the nucleus of the micelle and the condensation product or metal derivative being adsorbed on the surface of the inorganic metal compound nucleus. These associates are, however, independent chemical entities and exist as such even when not incorporated in an oil. Regardless of the nature of the relationship between the inorganic metal compound and the surface-active agent, the inorganic metal compound is stably and permanently incorporable with liquid hydrocarbon materials, such as mineral oils.

The inorganic portion of the new associates comprises at least one inorganic compound of a metal. Since the metal hydroxides, metal oxides and metal salts of weak volatile organic acids, particularly these derivatives of alkali and alkaline earth metals, are capable of neutralizing the acidic materials formed on combustion of the usual fuels used in internal combustion motors, and thus are of greatest interest in connection with lubricating compositions, such metal compounds form the preferred inorganic metal compound portion of the new associates. It should be noted, however, that the inorganic metal compound portion of the new associates is not limited to such basic compounds; also, that the compounds of polyvalent metals other than the alkaline earth metals—for example, the compounds of heavy polyvalent metals such as copper, cobalt, mercury, iron, lead, tin, zinc and the like—are important, since associates of such compounds with surface-active agents considered herein are useful as biocides, particularly as fungicides for preservation of wood, cloth, and the like. The anion of the inorganic metal compound may be any anion which forms a compound with a metal cation, said compound being substantially insoluble in a liquid hydrocarbon. In many cases, the metal cation is the important portion of the inorganic metal compound, the anion being considered inert; in such cases, the anion used should be one which permits easy preparation of the associate, as is set out hereinafter. In most cases of this sort, it will be found that the anion of a weak inorganic acid is most effective, and convenient. The "weak organic acids" are those which have a dissociation constant (or in the case of polybasic acids, a dissociation constant for the primary hydrogen) in water of less than about $1 \times 10^{-1}$. The "volatile weak inorganic acids" are those which are relatively volatile in aqueous solution—i.e., those which vaporize from aqueous solutions at or below the boiling point thereof. Examples of anions of weak inorganic acids are the thiosulfate radical ($S_2O_3^=$), the trithionate radical ($S_3O_6^=$), the arsenate radical ($AsO_4^=$), the thioarsenate radical ($AsS_3^-$), the arsenite radical ($AsO_3^=$), the thiocyanate radical ($SCN^-$), the antimonate radical ($SbO_4^{-3}$), the antimonite radical ($SbO_2^-$), the cyanide radical ($CN^-$), the cyanate radical ($CNO^-$), the phosphate radical ($PO_4^{-3}$), the chromate radical ($CrO_4^=$), the metaborate radical ($BO_2^-$), the tetraborate radical ($B_4O_7^=$), the aluminate radical ($AlO_2^-$), the stannate radical ($SnO_3^=$), the plumbite radical ($PbO_2^-$), the carbonate radical ($CO_3^=$), the bicarbonate radical ($HCO_3^-$), the sulfite radical ($SO_3^=$), the sulfide radical ($S^=$), and the like. The last four radicals mentioned are exemplary of the anions derived from volatile weak inorganic acids.

When the anion is the important portion of the inorganic metal compound, the metal cation should be chosen so as to permit easy preparation of the associate. Of course, when the inorganic metal compound per se—that is, the combination of the particular cation and particular anion—is the important factor, no choice of anion or cation can be made.

The organic portion of the new associates comprises any oil-soluble non-ionic surface active compound or material containing a plurality—that is to say, two or more—non-acidic hydroxyl groups. By non-acidic hydroxyl group is meant any hydroxyl group not forming a part of a carboxyl group, and which is not of phenolic character. The preferred subgenus of this class of materials comprises the oil-soluble high molecular weight polyalcoholic polymeric compounds obtained by substantially completely hydrolyzing the copolymers of long chain alpha olefinic hydrocarbons (normal or branched-chain) containing a terminal—$CH=CH_2$ group and containing an uninterrupted chain of at least 10—and preferably at least 16— carbon atoms with a vinyl ester of a lower fatty acid having up to five carbon atoms, such as vinyl acetate. These hydrolyzed polymeric materials are macromolecular compounds containing essentially a plurality of recurring alkyl-1,2-ethylene and hydroxy-1,2-ethylene units joined together in a chain-like manner, wherein the alkyl radicals contain at least 8 carbon atoms; and there may be a minor proportion of alkanoyloxy-1,2-ethylene units as essentially the only other polar containing group. The ratio of the non-acidic oxygen-containing units—(hydroxyl- and alkanoyloxy-) 1,2-ethylene units—to the hydrocarbon units—alkyl-1,2-ethylene units—is from about 1 to about 6, and preferably from about 1 to about 5. The average molecular weight of the final product is from about 4,000 to about 50,000. Preferably the molecular weight of the product is less than about 15,000. (These molecular weights are those obtained by the light scattering methods set out in Chemical Reviews, vol. 40, p. 139 (1948).) The non-acidic oxygen-containing polar groups present in the final product are predominantly hydroxyl, being at least 80% hydroxyl, preferably at least 90% or as high as 99% of the non-acidic oxygen-containing polar mixture. The product must contain at least two non-acidic hydroxyl groups per molecular unit of the copolymer and preferably the copolymer contains at least 3 such hydroxyl groups per molecule.

These special copolymers are preferably prepared by copolymerizing a vinyl ester of a lower fatty acid such as acetic acid, propionic acid, isobutyric acid or isovaleric acid, with an ethylenically unsaturated monomer having a single ethylenic group and containing at least 10, and preferably at least 16 carbon atoms, the ester and ethylenic compound being reacted in such proportions as to form a copolymer having the desired molecular weight and an average of from 1 to 6 units of the vinyl ester per unit of the hydrocarbon group derived from the ethylenic compound, and then hydrolyzing this product so as to convert from 25% to 99% of the vinyl ester linkages to hydroxyl groups, each molecular unit of the copolymer product containing at least two such hydroxyl groups.

Such copolymeric materials and methods for producing them are described in detail in copending application Serial Number 550,391, filed December 1, 1955, now Patent No. 2,913,439.

It must be noted that the new associates themselves are suitable as the starting material, the product obtained from such associates being an associate containing a greater amount of the inorganic metal compound associated with the same amount of surface-active agent. Associates containing more than one inorganic metal compound also may be prepared by this method.

The new associates can be formed by any one or more of several methods, all of which involve intimately commingling the inorganic metal compound in the form of solid particles of colloidal dimensions with the surface-active agent in the presence of a liquid reaction. The most effective method in any given case will be determined by the character of the metal compound.

For example, the associates may be prepared by first forming a colloidal suspension of the metal compound in a lower alcohol, such as methanol, thereafter intimately mixing the suspension with a solution of the surface-active agent, preferably in a light hydrocarbon solvent such as xylene or a mineral lubricating oil fraction, and thereafter removing the alcohol, and if desired, the hydrocarbon solvent. This method is best suited, perhaps, to the preparation of associates wherein the metal compounds are oxides, hydroxides and carbonates of alkali metal and alkaline earth metals, and to cases where the metal of the metal compound and that of the metal derivatives are to be the same. A method for preparing colloidal metal carbonates is set out by Neuberg, Biochem. Z., 1906, 1, 166; S. Ber. der Akad. Wissenschaft zu Berlin, 1907, 2, 820, and by A. Burzagh, Kolloid Z., 1926, 38, 222; 1926, 39, 218. A method for preparing colloidal oxides and hydroxides is set out in U.S. Patent No. 2,671,758.

For metal compounds other than alkali metal hydroxides, the associates are probably most effectively prepared by forming the metal compound in situ in the presence of the surface-active agent. Preferably, in such processes the surface-active agent is dissolved in a medium with a low dielectric constant—i.e., having a dielectric constant of less than 10 (as set out in the table beginning page 1253 of Lange's Handbook of Chemistry, 8th edition, 1952)—such as the various water-immiscible liquid hydrocarbons. Also, there is present in the reaction medium either water or an organic oxygen-containing liquid, and the metal compound is formed in situ in this reaction medium by separately but simultaneously introducing the component cation and anion of the metal compound into the reaction medium.

Such methods involving the formation of the metal compound in situ in the presence of the surface-active agent fall into two general classes: those involving a metathetic reaction between two inorganic metal compounds, one containing the cation and the other the anion required to form the desired inorganic metal compound, and those involving direct reaction of an acid containing the necessary anion and a base of the necessary metal cation.

Where the metal compound is formed by the metathetic reaction of an inorganic metal compound containing the desired metal cation and an inorganic compound of a dissimilar metal containing the desired anion, the surface-active agent is first dissolved in a suitable water-immiscible solvent, water or an oxygen-containing organic liquid compound is added, and thereafter the two metal compounds are added so that the desired metal compound is formed only in the presence of the heterogeneous system in which the surface-active agent is present. It is essential that the inorganic metal compound be formed under such conditions that the particles thereof are of near-molecular size, and are intimately contacted with the solution of the surface-active agent in the water-immiscible solvent. It is also desirable that the two compounds chosen to form the metal compound be such that the inorganic metal compound is less soluble in the aqueous or oxygen-containing organic liquid phase than are either of the two starting compounds, or that the amount of such solvent be so chosen that the inorganic metal compound formed is not entirely soluble therein— under such conditions formation of the desired associate is promoted. Preferably, the process is carried out by first intimately mixing a solution of one of the starting metal compounds in water or an oxygen-containing organic liquid (preferably a lower alkanol) with a solution of the surface-active agent in a water-immiscible liquid, and while maintaining intimate mixing at all times, slowly adding a solution of the other starting metal compound in water or an oxygen-containing organic liquid—preferably the solvent is the same for both starting metal compounds—and thereafter removing the water or oxygen-containing organic liquid and any solid materials to give a solution of the desired associate in the water-immiscible liquid. Formation of the associate is usually conducted at a temperature of from about 50° C. to about 250° C., the pressure being adjusted as and if necessary to maintain the various components of the reaction mixture in the liquid phase.

Where the metal compound is formed by reaction of an acid of the desired anion and a base of the desired metal cation, the formation of the associate carried out in much the same manner as for the metathetic formation of the compound as set out above. Two general variations of this method are used: in one variation, the surface-active agent is dissolved in a water-immiscible solvent, water is added, the metal base is added, the entire mixture is thoroughly mixed and while mixing is carried on continuously, the acid is slowly added, and the water is thereafter removed. In the second variation, the surface-active agent is dissolved in a solvent comprising at least 25% by weight of an oxygen-containing organic liquid, the metal base is added, the acid is slowly added, and the solvent thereafter removed. In this variation the solvent used preferably contains sufficient of a water-immiscible organic liquid to dissolve all of the associate formed after the oxygen-containing organic liquid has been removed. It is desirable that the system be substantially anhydrous—or that it contain but a very small proportion of water.

This method is of particular value for forming the new associates in which the metal compound is the inorganic metal salt of a weak inorganic acid, and particularly a volatile weak inorganic acid.

According to the first variation of this method, the surface-active agent is dissolved in a water-immiscible liquid, such as a lubricating oil or a light hydrocarbon liquid such as xylene, the solution is heated to a temperature of from about 50° C. to about 250° C., and while this temperature is maintained, is thoroughly mixed with an aqueous solution or suspension of the appropriate metal base, preferably the hydroxide, the acid of the appropriate anion is then added slowly, and the mixture is dehydrated, by maintaining the temperature and the agitation until all of the water has been removed. The mixture is then filtered to remove any solid materials, and then allowed to cool. The pressure on the system is controlled to maintain a substantial aqueous phase in the reaction mixture until all of the acid has been added, then to allow slow removal of the water. There must be at least two percent by weight of water, based upon the weight of the reaction mixture, at the time the last of the acid has been added.

In the second variation of this method, the reaction medium comprises at least 5% by weight of an oxygen-containing organic liquid; preferably, the reaction medium also contains a substantial proportion of a water-immiscible organic liquid, such as a light hydrocarbon liquid, which is a good solvent for the surface-active agent. The surface-active agent is dissolved in the reaction medium, the solution is heated to a temperature of from about 20° C. to about 150° C., and the in situ formation of the metal compound carried out as in the first variation. The oxygen-containing liquid is removed after the reaction is complete by distillation of the mixture. The pressure on the system is adjusted to maintain the reaction medium as a liquid until distillation of the oxygen-containing liquid is begun.

As the oxygen-containing liquid, any non-acidic—i.e., neutral to basic oxygen-containing oragnic liquid which boils below about 140° C. may be used. Included within this general class are such lesser classes of compounds as the alcohols, ketones, ethers, and esters. It is preferred that the oxygen-containing organic liquid be aliphatic in character, which includes also the cycloaliphatic compounds. Examples of these preferred oxygen-containing compounds are the aliphatic alcohols, the aliphatic ketones, such as methyl ethyl ketone, diethyl ketone, methyl propyl ketone and cyclohexanone; the aliphatic ethers, such as diisopropyl ether, methyl and ethyl cellusolves, 1,3- and 1,4-dioxanes and the like, and esters of aliphatic carboxylic acids, such as ethyl acetate, ethyl lactate, ethyl propionate, and n- and isopropyl acetates. A preferred class of the oxygen-containing organic liquids comprises the monohydric lower aliphatic alcohols, particularly those containing from 1 to about 6 carbon atoms. Examples of this class include methanol, ethanol, 1- and 2-propanols, n-, sec-, and tert-butyl alcohols, and the various $C_5$- and $C_6$- alcohols, both straight-chain and branched-chain in configuration. It is preferred that the oxygen-containing organic liquid be substantially water-miscible, and complete water-miscibility is desirable, the alkanols containing from 1 to 3 carbon atoms being most suitable.

In many cases, it is preferred that the reaction mixture include a substantial proportion of a water-immiscible liquid. It is preferred that the water-immiscible liquid be a good solvent for the surface-active agent and, further, that it be at least partially (desirably completely) miscible with the oxygen-containing liquid. It is preferred that the water-immiscible liquid have a low viscosity at ordinary room temperatures and, further, that it be substantially hydrocarbon in character. Such hydrocarbons as benzene, toluene or xylene are quite suitable, as are mixtures of one or more of these compounds. Gasoline fractions, for example gasoline fractions boiling in the range of from about 100° C. to about 150° C. also are suitable. Mineral oil fractions generally are suitable, provided their viscosity is not too high. It is preferred that the boiling point of the water-immiscible liquid be less than about 300° C. Lubricating oil fractions having a viscosity of from about 100 to about 400 seconds Saybolt Universal at 38° C. are suitable. It is preferred that the water-immiscible liquid used be a hydrocarbon boiling in the range of from about 100° C. to about 200° C.

The amount of oxygen-containing liquid present in the reaction zone is critical with respect to the formation of the associate. The amount of the oxygen-containing liquid must comprise at least 5% by weight, and preferably at least 10% by weight of the total liquid charged to the reaction zone—i.e., the total of the water-immiscible liquid plus the oxygen-containing liquid charged. Where a water-immiscible liquid is used, the amount of such liquid should comprise at least about 10% and preferably from about 25% to about 50% by weight of the total liquid phase present. The concentration of the surface-active agent in the solvent should be at least about 10% by weight of the solvent. It is preferred that the water-immiscible liquid, the oxygen-containing liquid and the relative amounts thereof, as compared to each other and to the amount of the surface-active agent charged, be so chosen that a substantially homogeneous system results.

But a small amount of water can be tolerated in the reaction mixture, without adverse effect upon the amount of inorganic compound associated or the stability of the product. In general, no rule can be stated regarding the maximum amount of water which can be present in the reaction zone without causing difficulties, but in general it is desirable that there be in the reaction zone no separate phase whose predominant component is water. The effect of the water on overcarbonation, has, however, been found to be much less where a large proportion of the oxygen-containing organic liquid is used. In the case where the weight ratio of the liquid to the surface-active agent lies at about 50%—from about 35% to about 65%—by weight of the surface-active agent charged an amount of water amounting to as much as 10% by weight of the reaction mixture may be present without undue danger of overcarbonation. The proportion of water in the reaction mixture should, therefore, be maintained below this limit, where high oxygen-containing liquid surface-active agent weight ratios exist. Where the weight ratio is substantially below about 50%—i.e., below about 25%—the amount of water permissible is correspondingly lower, preferably less than about 4 percent by weight of the reaction mixture.

Formation of the associate is most conveniently effected by first preparing the solvent, whether it be pure oxygen-containing organic liquid, or a composite solvent comprising the oxygen-containing liquid and the water-immiscible liquid, dissolving the surface-active agent in the solvent and then forming the inorganic metal compound from its component ions in this reaction mixture. The inorganic metal compound must be formed in situ in the presence of the surface-active agent and the oxygen-containing organic liquid—that is to say, the metal base and the acid are introduced separately into the reaction zone so that the molecules of inorganic metal compound are formed from the component ions only in the presence of the surface-active agent and the oxygen-containing liquid. This procedure is essential to the formation of the desired associate. The inorganic metal compound can be formed by first adding the metal base and then adding the acid, or the order of addition of these two reactants may be the reverse. The two reactants preferably should not be added simultaneously. It has been found that the amount of inorganic metal compound associated per mole of surface-active agent is greatest when the inorganic metal compound is formed under such conditions that the particles of that compound are near-molecular in size. Consequently, the second reactant added should be added slowly, while the reaction mixture is agitated thoroughly, so as to avoid local excesses of the second reactant and consequent formation of particles of larger than near-molecular size.

The acid and/or metal base may be added as such, but preferably are added in the form of solutions or suspensions of these compounds in water or in an oxygen-containing organic liquid, preferably the same oxygen-containing liquid as is present in the reaction zone. It is preferred that the concentration of these compounds in the solution or suspension be from about 10% to about 60% by weight, and it is most desirable that the concentration of the compound lie within the range of from about 20% to about 40% by weight of the solution or suspension. When such solutions or suspensions are used, due care must be taken to maintain the concentration of water and/or oxygen-containing liquid in the reaction zone within the ranges heretofore set out. Where the acid is a volatile acid, the acid is most conveniently added in the form of its anhydride. Thus, where the metal compound is to be a carbonate, carbon dioxide is passed into the reaction mixture containing the metal base. In like manner sulfur dioxide may be used to form the metal sulfite, hydrogen sulfide may be used to form the metal sulfide, etc.

The amount of metal base charged should be such that when the desired amount of metal compound has been associated—relative to the amount of surface-active agent present—an excess of base exists in the reaction mixture. The ratio of the number of moles of acid charged per mole of base present, at the point where the desired amount of metal compound has been associated, must not exceed about 1.0, and preferably does not exceed about 0.9. It is desirable that this ratio remain below 0.85. To insure maximum association of the metal compound economically, however, the acid to base ratio should be at least about 0.5, though in special cases, the ratio may be somewhat lower. Since a small proportion of the metal compound formed will not be associated, there should be provided a slight excess of the base over the amount theoretically needed to form the desired amount of associated metal compound. Thus, the desired amount of associated metal compound must be first determined; in calculating the amount of base to be charged to provide this amount, an excess of about 5–10% (molar) (and not exceeding about 15%) should be included to allow for the portion of the metal compound not solubilized. Further, due allowance must be made for providing the necessary acid to base mole ratio, as previously set out.

The following examples are offered to illustrate preparation of the new associates of this invention: In these examples, parts by weight bear the same relation to parts by volume as does the kilogram to the liter. The molecular weights were determined by light scattering methods and the ratio of vinyl ester groups to olefin groups was determined by analysis for ester values.

EXAMPLE I 50 parts by weight of a hydrolyzed reaction product of one mole of $C_{16}$–$C_{18}$ alkenes and 2 moles of vinyl acetate, and containing 3 hydroxyl groups per molecule, was dissolved in 500 parts by volume of xylene, 50 parts by volume of methanol. 74 parts by weight of calcium hydroxide was added to the solution. This mixture was heated to 50° C. and while being maintained at this temperature and while being thoroughly agitated, was treated with 11.97 parts by volume (measured at a pressure of 762 millimeters mercury pressure and at 21.2° C.) of gaseous carbon dioxide, the carbon dioxide being passed into the mixture at a constant rate over a period of one hour. The methanol and the water of reaction, together with a small quantity of xylene, were removed by distillation of the reaction mixture until the bottoms temperature was 137° C. (a total of 185 parts by volume were removed). The bottoms were cooled and centrifuged to remove solid materials (mainly calcium hydroxide and calcium carbonate). The xylene was then stripped to give a yellow, transparent, glassy solid product containing 14.4% by weight of calcium. A solution of this product in a lubricating oil—the solution containing 1.92% by weight of calcium as the associate—was completely clear after being stored at 100° C. for 2 months; no precipitate formed. If desired, when a solution of the product is to be the end product, the solvent may be added to the centrifuged product, and the xylene thereafter removed.

EXAMPLE II

A copolymer of vinyl acetate and octadecene-1 was prepared by warming a mixture comprising vinyl acetate and octadecene-1, in the mole ratio of 1.9 moles of vinyl acetate per mole of octadecene-1, and containing 1% by weight (based on the weight of olefin) of benzoyl peroxide, to 80° C. for 16 hours. The monomers were stripped off at a temperature of 200° C. at a pressure of 18 millimeters mercury. Alcoholysis of the copolymer was carried out in a glass lined kettle equipped with stirrer and reflux condenser. The kettle was charged with a mixture of methanol and copolymer, in the ratio of 0.72 part by weight of methanol per part by weight of copolymer, and 1% by weight of the copolymer of sodium methylate was added. The charge was stirred and refluxed for 2 hours (64–65° C.), was then cooled to 45° C. and neutralized with a 10% by weight excess of glacial acetic acid. The mixture was then stripped at 96° C. and 68 millimeters mercury pressure. Analysis of the resulting product indicated that the copolymer had a vinyl acetate plus vinyl alcohol to olefin ratio of 4:1, 76% hydrolysis of the vinyl ester to hydroxyl groups, a molecular weight of about 15,000 and approximately 95 hydroxyl groups per molecule.

200 parts by weight of this copolymer was dissolved in 1200 parts by weight of xylene, 120 parts by weight of calcium hydroxide in 220 parts by weight of methanol were added, the mixture thoroughly stirred and heated to about 55° C., and 32 parts by weight of carbon dioxide were passed into the mixture over a period of 1 hour. The reaction mixture was then settled and the solids discarded. The product had a base number of 15.

To demonstrate that the amount of calcium carbonate associated with the copolymer could be increased, the product thus obtained was then mixed with an additional 100 parts by weight of calcium hydroxide and 50 parts by weight of methanol, was again heated to about 55° C. with stirring and treated with an additional 36 parts by weight of carbon dioxide over a period of 1 hour. The crude product of this reaction had a base number of 50. The crude product was filtered and stripped of solvent, to give as final product a clear, yellow solid with a base number of 274. A concentrate of this material in 100 VI neutral oil was made; this concentrate had a base number of 103, and a sulfated residue 12.6%. The concentrate was fully stable—that is, none of the associated inorganic compound precipitated from the solution during storage thereof.

EXAMPLE III 200 parts by weight of the copolymer of Example II were dissolved in 1200 parts by weight of benzene and 500 parts by weight of methanol. 100 parts by weight of calcium hydroxide in 220 parts by weight of methanol were added, the mixture thoroughly stirred and heated to a temperature of about 55° C. 33 parts by weight of boric acid, dissolved in 300 parts by weight of methanol, was added dropwise over a perior of 1 hour. The product thus obtained was centrifuged to remove the solids present, the alcohol and a part of the benzene were removed to give a benzene solution of an associate containing approximately 1% by weight of boron, present in the form of calcium borate.

The solution of the associate thus obtained was again treated according to this same procedure. The product was a benzene solution of the associate having a base number of 24. The associated contained approximately 3% by weight of boron, as calcium borate.

The hydrocarbon oils which are improved by the incorporation of the associates of this invention are those which have an initial boiling point of around 500° F., including various fuel oils and lubricating oils, particularly distillate fuel oils such as treated or untreated cracked fuel oils or mixtures of cracked and straight run fuel oils, usually have components normally distilling at about 500° F., and have an end distillation point of around 750° F. Fuel oils of this type include Nos. 1, 2, and 3 fuel oils, gas oils, furnace oils, burner oils, diesel fuel oils, kerosene and mixtures thereof. The lubricating oils may be obtained from paraffinic, naphthenic, asphaltic, or mixed base crude oil, as well as mixtures thereof. The viscosity of these oils may vary over a wide range such as from 50 SUS at 100° F. to 100 SUS at 210° F. The hydrocarbon lubricating oils may be blended with fixed oils such as castor oil, lard oil, and the like, and/or with synthetic lubricants such as polymerized olefins, the polyalkylene glycols such as copolymers of alkylene glycols, and alkylene oxides, organic esters, especially the polyesters, e.g., 2-ethylhexyl sebacate, dioctyl phthalate, trioctyl phosphate; polymeric tetrahydrofuran, polyalkyl polysiloxanes (silicones) e.g., dimethyl silicone polymer, and the like.

Various mineral lubricating oils are effectively improved by the present associates. They may be represented by an SAE 30 refined mineral oil having the following properties:

| | |
|---|---|
| Gr° API | Min. 24.5 |
| Pour point, °F. | Max. −5 |
| Flash, COC, °F. | Min. 415 |
| Viscosity, SUS at 210° F. | 58–63 |
| Viscosity index | 50–60 |

The associates of this invention are effective when used in very small amounts, to improve the properties of either fuel oils or lubricating oils. In general, from about 1 to 500 and preferably from about 10 to about 100 parts of the associate in one million parts (by weight) of the oil (0.001% to 0.01% wt.) is sufficient to improve fuel oils with respect to screen clogging and the like. When the associate is used to improve lubricating oils, the amount can vary from about 0.01% to about 10% and preferably from about 0.1% to about 5% by weight of the oil composition.

In addition to the associates of this invention, auxiliary additives can be used in conjunction with the fuel oil or lubricating oil compositions. Such additives include fuel oil color stabilizers such as alkyl amines, e.g., tri-n-butyl amine or 2,4,6-tri (dimethylaminomethyl)-phenol; metal deactivators, e.g., N,N'-disalicylidene 1,2-diamino propane; antioxidants, corrosion inhibitors, and the like. The auxiliary lubricating oil additives include pour point and viscosity index modifiers such as the Acryloid polymers, anti-foaming agents such as silicone polymers, corrosion, friction, and oxidation inhibitors, e.g., alkyl phenols, allophanates, alkyl phosphates, and salts thereof, blooming agents, and the like. These auxiliary additives may be used in amount varying from 0.05% to about 5% by weight.

To demonstrate the utility and improved properties of oil solutions of the new associates, tests were made on such solutions in accordance with the following test procedures. The results of the tests are given in Tables I through III.

*1. Low temperature sludge test*

The anti-sludging properties of the new associates were determined by testing a solution of the associate obtained in Example II in a 150 HVI neutral lubricating oil fraction, said solution containing 2% by weight of the associate, under conditions conducive to the formation of sludge.

The test procedure was substantially that of CRC Designation EX-3, as this procedure was set up in November 1952. The test was designed to simulate operation of an automotive motor under heavy city traffic conditions—that is to say, stop-and-go driving—wherein the motor operates at relatively low temperatures, and thus permit determination of the amount of motor deposits formed under such conditions. The test procedure involved cyclic operation, at high blow-by rates of an automotive gasoline motor at idling, low-temperature, high-load, and high-temperature, high load conditions, respectively.

The tests were conducted in a Chevrolet six-cylinder, valve-in-head motor, under the following principal operating conditions:

| Cycle Portion | Time, hours | Speed, r.p.m. | Load, b.m.e.p. | Temperatures, Coolant out | °F Oil | Air-Fuel Ratio |
|---|---|---|---|---|---|---|
| Part I | 2 | 500 | 0 | 125 | 125 | 9.0:1 |
| Part II | 2 | 2500 | 66 | 95 | 165 | 14.5:1 |
| Part III | 2 | 2500 | 66 | 190 | 245 | 14.5:1 |

This basic cycle was repeated 16 times per test for a total test time of 96 hours.

At the end of the test period, the motor was disassembled and the internal parts visually inspected. The following data was noted:

(1) Piston varnish; rating: 0–10 (10=clean).
(2) Total varnish in motor; rating: 0–50 (50=clean).
(3) Sludge; rating: 0–80 (80=no sludge).

(4) Combined lacquer and sludge; rating: 0–100 (100= clean, no sludge).
(5) Ring plugging; rating: percent.
(6) Clinder bore wear:
 (a) Increase in cylinder bore diameter, ten-thousandths of inches.
 (b) Loss in weight of top ring, milligrams.

The results of the tests of the solution of the associate of Example II are summarized in Table I. For comparison, results of the same tests on an oil solution of a commercial copolymer of dodecyl methacrylate and diethyl aminoethylmethacrylate, widely used as a detergent and antisludge agent for lubricating oil compositions are given. Also for comparison, the results of the same tests on an oil solution of a hydrolyzed copolymer of vinyl acetate and 1-octadecene similar to that used in the preparation of the associate of Example II are given. In Table I, the commercial copolymer is designated as Compound Z and the hydrolyzed copolymer of vinyl acetate and 1-octadecene is designated as Compound Y. The concentration of Compounds Y and Z in their respective solutions was 2% by weight, and each solution contained

TABLE I

| Test Solution | Piston Varnish | Total Varnish | Sludge | Combined sludge and varnish | Ring Plugging | Bore increase | Wear Wt. loss |
|---|---|---|---|---|---|---|---|
| Example II Associate | 8.6 | 41 | 75 | 89 | 11 | 4 | 58 |
| Compound Z | 7.4 | 38 | 62 | 77 | | | |
| Compound Y | 8.3 | 44 | 55 | 78 | 21 | 9 | 101 |

0.8% by weight of a commercial oxidation inhibitor sold under the designation of Lubrizol 1060. The solution of the new associate did not contain any of the oxidation inhibitor.

The associate prepared in Example I also was tested under operating conditions simulating stop-and-go operation at low temperatures to determine the antisludging properties of this associate. The motor used was a Petter Series II, single-cylinder, four-stroke, liquid-cooled gasoline motor. The motor was first run at idling conditions, then under quarter load, and finally under full-load, this cycle being repeated several times over a period of 40 hours. The crankcase temperature was maintained at 40° C. The fuel used was a commercial gasoline containing 0.15% by weight of sulfur and 1.0 milliliter of tetraethyl lead per United States gallon. The amount of sludge formed on the inside of the motor (as estimated visually) is a criterion of the antisludge rating of the test oil solution used. The rating is expressed as a number from 0 (heavy sludge) to 10 (no sludge).

Table II summarizes the results of the tests made on a solution of a lubricating oil stock known as Cardon La Paz 160, which is a neutral lubricating oil stock with a high viscosity index and a Redwood I viscosity of 160 at 140° F. The test solution contained sufficient of the associate to give the solution a calcium content of 0.225% by weight. Comparison is made to the sludge rating of the base oil under the same conditions, and to a solution of a complex of 2.46 moles of calcium carbonate with 1 mole of the calcium salt of $C_{14}$-$C_{18}$ alkylsalicylic acids, the concentration of calcium in the test solution also being 0.225% by weight. This complex is representative of materials widely used as detergents and anti-wear additives for lubricating oil compositions. The complex is designated as Compound X in Table II.

TABLE II

Test solution: Sludge rating
Base oil _____ 6.0
Base oil+Compound X _____ 6.4
Base oil+associate of Example I _____ 9.6

II. Anti-wear tests

The associate of Example I also was tested in a C.F.R. single-cylinder engine under such conditions that the anti-wear properties of the associate were demonstrated. In this test, a 45-hour continuous run is carried out, employing conditions of high load, medium-speed (1200 r.p.m.) and low cylinder and oil temperatures (40° C.). The fuel used was a commercial gasoline containing 0.12% by weight of sulfur and 1.2 milliliters of tetraethyl lead per United States gallon. Before and after the runs on the test solutions, runs are carried out on a straight mineral reference oil using the same operating conditions and same components. The performance of the test solution is judged by the total weight loss of the four compression rings and the oil ring.

Table III summarizes the results of the tests made on a solution of the associate of Example I in Cardon La Paz 160 lubricating oil, the solution containing sufficient of the associate to give the solutions a calcium content of 0.05% by weight. Comparison is made to a solution of the complex designated above as Compound X, the solution also containing 0.05% by weight of calcium.

TABLE III

Test solution: Ring weight loss (mg.)
Base oil—before _____ 257
Base oil+associate of Example I _____ 75
Base oil+Compound X _____ 84
Base oil—after _____ 283

We claim as our invention:

1. The process comprising intimately mixing a colloidal suspension of a basic inorganic metal compound in a lower saturated monohydric alcohol with a solution in a liquid hydrocarbon which is substantially immiscible with water, said hydrocarbon containing about 10% of the weight thereof of a hydrolyzed copolymer of an alpha hydrocarbon olefin having at least 10 carbon atoms with a vinyl ester of a fatty acid containing up to 5 carbon atoms, said hydrolyzed copolymer having a molecular weight of from about 4,000 to about 50,000, containing from about 1 to about 6 non-acidic oxygen-containing units per hydrocarbon unit therein, and containing at least two non-acidic hydroxyl groups per molecular unit, and thereafter removing said alcohol.

2. The process comprising forming the metal salt of a weak inorganic acid in situ in a heterogeneous system comprising a liquid hydrocarbon substantially immiscible with water, at least 10% of the weight thereof of a hydrolyzed copolymer of an alpha hydrocarbon olefin having at least 10 carbon atoms with a vinyl ester of a fatty acid containing up to 5 carbon atoms, said hydrolyzed copolymer having a molecular weight of from about 4,000 to about 50,000, containing from about 1 to about 6 non-acidic oxygen-containing units per hydrocarbon unit therein, and containing at least two non-acidic hydroxyl groups per molecular unit, and at least one of the group consisting of water and an aliphatic oxygen-containing organic liquid, and thereafter removing water and oxygen-containing organic liquid.

3. The process comprising commingling, in the presence of a liquid reaction medium consisting essentially of from 5% to 90% of an aliphatic oxygen-containing organic liquid, from 10% to 95% by weight of a liquid hydrocarbon which is substantially immiscible with water and from 0% up to the amount completely miscible with said oxygen-containing liquid of water, a metal compound of the group consisting of metal hydroxides, metal oxides, and metal salts of weak organic acids, in the form of solid particles of colloidal dimensions, with at least 10% of the weight of said liquid hydrocarbon of a hydrolyzed copolymer of an alpha hydrocarbon olefin having at least 10 carbon atoms, with a vinyl ester of a fatty acid containing up to 5 carbon atoms, said copolymer having a molecular weight of from about 4,000 to about 50,000, said hydrolyzed copolymer containing at least two non-acidic hydroxyl groups per molecular unit and containing from about 1 to about 6 non-acidic oxygen-containing units per hydrocarbon unit therein.

4. The process comprising commingling, in the presence of a liquid reaction medium consisting essentially of from 5% to 90% of an aliphatic oxygen-containing organic liquid, from 10% to 95% by weight of a liquid hydrocarbon which is substantially immiscible with water and from 0% up to the amount completely miscible with said oxygen-containing liquid of water, a metal compound of the group consisting of metal hydroxides, metal oxides, and metal salts of weak inorganic acids, in the form of solid particles of colloidal dimensions, with at least 10% of the weight of said liquid hydrocarbon of a hydrolyzed copolymer of a vinyl ester of a fatty acid containing up to 5 carbon atoms, and an ethylenically unsaturated hydrocarbon monomer having a single ethylenic group which is in a terminal position and has an uninterrupted chain of at least 10 carbon atoms, and containing units of the vinyl ester, vinyl alcohol and the monomer possessing at least 16 carbon atoms, said copolymer having an average of 1 to 6 vinyl alcohol and vinyl ester units per unit of the monomer having the chain of at least 16 carbon atoms and 25% to 99% of the vinyl alcohol and vinyl ester units being vinyl alcohol units, and the said hydrolyzed copolymer having a molecular weight between 4,000 and 50,000 as determined by the light scattering method.

5. The process comprising forming a metal salt of a weak inorganic acid in situ in the presence of a liquid hydrocarbon which is substantially immiscible with water, a substantial amount of water and at least 10% of the weight of said liquid hydrocarbon of a hydrolyzed copolymer of an alpha hydrocarbon olefin having at least 10 carbon atoms with a vinyl ester of a fatty acid containing up to 5 carbon atoms, said hydrolyzed copolymer having a molecular weight of from about 4,000 to about 50,000, containing from about 1 to about 6 non-acidic oxygen-containing units per hydrocarbon unit therein, and containing at least two non-acidic hydroxyl groups per molecular unit, the amount of said water being at least 2% of the weight of the resulting reaction mixture, and thereafter removing the water.

6. The process comprising forming the metal salt of a weak inorganic acid in situ in the presence of a liquid reaction medium comprising from 10% to 100% by weight of an aliphatic oxygen-containing organic liquid, from 0% to 90% by weight of a liquid hydrocarbon which is substantially immiscible with water, from 0% up to the amount completely miscible with said oxygen-containing organic liquid of water, and in the presence of at least 10% by weight of said reaction medium of a hydrolyzed copolymer of an alpha hydrocarbon olefin having at least 10 carbon atoms with a vinyl ester of a fatty acid containing up to 5 carbon atoms, said hydrolyzed copolymer having a molecular weight of from about 4,000 to about 50,000, containing from about 1 to about 6 non-acidic oxygen-containing units per hydrocarbon unit therein, and containing at least two non-acidic hydroxyl groups per molecular unit, thereafter removing said oxygen-containing organic liquid.

7. The process according to claim 6 wherein the oxygen-containing organic liquid is a lower aliphatic alcohol.

8. The product produced according to the process of claim 1.

9. The product produced according to the process of claim 3.

10. The product produced according to the process of claim 4.

11. The product produced according to the process of claim 4 wherein the vinyl ester is vinyl acetate and the ethylenically unsaturated monomer is an alpha-hydrocarbon olefin containing at least 16 carbon atoms and wherein the hydrolyzed copolymer has an average of 1 to 5 units of the vinyl alcohol and vinyl ester units per unit of the monomer and has a molecular weight of about 30,000.

12. The product produced according to the process of claim 4 wherein the vinyl ester is vinyl acetate and the ethylenically unsaturated monomer is an alpha hydrocarbon olefin mixture containing octadecene-1, and wherein the hydrolyzed copolymer has an average of 3 to 5 vinyl alcohol units per molecular unit of said copolymer, and the copolymer has a molecular weight of between 15,000 and 30,000.

13. The product produced according to the process of claim 5.

14. The product produced according to the process of claim 6.

15. An improved hydrocarbon oil composition comprising a major amount of a hydrocarbon oil having incorporated therein a minor amount sufficient to impart detergency to said hydrocarbon oil of the product of the process of claim 3.

16. An improved hydrocarbon oil composition comprising a major amount of hydrocarbon oil having incorporated therein a minor amount sufficient to impart detergency to said hydrocarbon oil of the product of the process of claim 4.

References Cited in the file of this patent

UNITED STATES PATENTS

| | | |
|---|---|---|
| 2,316,079 | Loane et al. | Apr. 6, 1943 |
| 2,551,643 | Seger et al. | May 8, 1951 |
| 2,578,585 | Orozco et al. | Dec. 11, 1951 |
| 2,623,016 | Mertes | Dec. 23, 1952 |
| 2,671,758 | Vinograd et al. | Mar. 9, 1954 |
| 2,676,925 | Lindstrom et al. | Apr. 27, 1954 |
| 2,708,182 | Jahn | May 10, 1955 |
| 2,780,597 | Williams et al. | Feb. 5, 1957 |
| 2,800,450 | Bondi et al. | July 23, 1957 |
| 2,800,453 | Bondi et al. | July 23, 1957 |
| 2,809,161 | Lowe et al. | Oct. 8, 1957 |

OTHER REFERENCES

"Atlas Surface Active Agents," Atlas Powder Co., 1948 (pages 42, 58 and 59).

"Motor Oils and Engine Lubrication," by Georgi, 1950, Reinhold Pub. Corp., page 170.